(12) United States Patent  
Dovali-Solis et al.

(10) Patent No.: US 7,310,950 B2  
(45) Date of Patent: Dec. 25, 2007

(54) INLET AIRFLOW COOLING CONTROL FOR A POWER GENERATING SYSTEM

(75) Inventors: Francisco Dovali-Solis, Oviedo, FL (US); Daniel E. Willems, Oviedo, FL (US); Dan W. Kozachuk, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 299 days.

(21) Appl. No.: 10/927,770

(22) Filed: Aug. 27, 2004

(65) Prior Publication Data

US 2005/0022536 A1 Feb. 3, 2005

Related U.S. Application Data

(63) Continuation-in-part of application No. 10/430,663, filed on May 6, 2003, now Pat. No. 6,923,003, which is a continuation-in-part of application No. 10/244,066, filed on Sep. 13, 2002, now Pat. No. 6,775,988.

(51) Int. Cl.  
*F02C 9/00* (2006.01)  
*F02C 3/30* (2006.01)

(52) U.S. Cl. ............................ 60/773; 60/775; 60/39.3; 60/728

(58) Field of Classification Search .............. 60/728, 60/39.53, 772, 773, 75, 39.3, 775  
See application file for complete search history.

(56) References Cited

U.S. PATENT DOCUMENTS

| | | | |
|---|---|---|---|
| 5,103,629 A | 4/1992 | Mumford et al. | |
| 5,252,860 A | 10/1993 | McCarty et al. | |
| 5,832,714 A | 11/1998 | Hines | |
| 5,867,977 A | 2/1999 | Zachary et al. | |
| 5,930,990 A | 8/1999 | Zachary et al. | |
| 6,173,564 B1 | 1/2001 | Zachary | |
| 6,250,064 B1 | 6/2001 | Tomlinson et al. | |
| 6,357,236 B1* | 3/2002 | Utamura | 60/728 |
| 6,446,440 B1 | 9/2002 | Ranasinghe et al. | |
| 6,484,508 B2 | 11/2002 | Rocklin et al. | |
| 6,530,224 B1 | 3/2003 | Conchieri | |
| 6,623,254 B2* | 9/2003 | Chowaniec et al. | 60/39.53 |
| 6,634,165 B2* | 10/2003 | Tomlinson et al. | 60/39.3 |
| 6,769,258 B2* | 8/2004 | Pierson | 60/772 |
| 6,775,988 B2* | 8/2004 | Willems | 60/775 |
| 6,880,343 B2* | 4/2005 | Kopko | 60/772 |
| 6,923,003 B2* | 8/2005 | Willems et al. | 60/775 |
| 2004/0050069 A1 | 3/2004 | Willems et al. | |

* cited by examiner

Primary Examiner—Ted Kim

(57) ABSTRACT

A power generating system (20) includes a generator (22) and a combustion turbine (24) for driving the generator (22). The combustion turbine (24) may have a combustion turbine air inlet (30) for receiving an inlet airflow (25). The power generating system (20) may include an evaporative water cooler (26) or fogging evaporative system (26') for cooling inlet airflow (25), and an inlet airflow temperature sensor (28) proximate or within the combustion turbine air inlet (30). The inlet airflow temperature sensor (28) may sense a drybulb temperature of the inlet airflow (25) proximate the air inlet (30). A controller (47') is provided for controlling the cooling of inlet airflow (25) across transient load conditions of the power generating system (20'). This control may be based upon the sensed drybulb temperature used to calculate an approach temperature with respect to the inlet airflow (25') that is compared to an approach temperature setpoint based on load. The controller may adjust the flow rate of water of the fogging system (26') to maintain the calculated approach temperature within limits of the setpoint.

15 Claims, 6 Drawing Sheets

INLET AIRFLOW COOLING CONTROL FOR A POWER GENERATING SYSTEM

RELATED APPLICATIONS

This application is a continuation-in-part of U.S. patent application Ser. No. 10/430,663, filed on May 6, 2003, now U.S. Pat. No. 6,923,003 titled "Power Generating Apparatus Having Combustion Turbine Inlet Air Flow Temperature Sensor For Sensing A Drybulb Temperature and Related Methods" and assigned to the assignee of the present invention, the entire disclosure of which is incorporated herein by reference, which is a continuation-in-part of U.S. patent application Ser. No. 10/244,066, filed Sep. 13, 2002 now U.S. Pat. No. 6,775,988, the entire disclosure of which is incorporated herein by reference.

BACKGROUND OF THE INVENTION

The present invention relates in general to power generating systems and more particularly to temperature sensing for controlling the cooling of inlet airflow to combustion turbine power generators.

An electrical power generator converts mechanical energy into electrical energy. A typical electrical power generator includes a stator and a rotor that rotates within the stator to thereby generate electricity. The rotor, in turn, is mounted to a shaft that drives the rotor. Various mechanical devices may be used to drive the shaft, such as a combustion turbine.

In a conventional configuration, the combustion turbine comprises a compressor to draw in and compress a gas, such as air, for example. A plurality of inlet guide vanes may regulate the inlet airflow into the compressor. The combustion turbine may also comprise a combustor or heat source that adds energy to the compressed gas and a turbine to extract power from a resulting heated gas expansion. In such a generator, the extracted power is used to drive the shaft, which rotates the rotor within the stator to generate electricity.

The capacity or power output of the combustion turbine may be increased if air drawn in by the compressor has a relatively lower temperature. Accordingly, cooling the ambient, or inlet, airflow before it is drawn into the combustion turbine can be a cost effective way to increase the capacity of the combustion turbine. One approach to cooling the inlet air is with a direct refrigeration-cooling system in which ambient air is cooled using conventional refrigeration devices and techniques. One drawback to the direct refrigeration-cooling system, however, is parasitic power loss. This is due to the relatively large power drain needed to power a refrigerator unit. According to some estimates, the parasitic power loss may be as much as thirty percent (30%) of the increased power output of the turbine power generator.

BRIEF SUMMARY OF THE INVENTION

One aspect of the invention provides a device for more accurate, more reliable temperature sensing of the inlet airflow of a combustion turbine using a means for introducing water into an inlet airflow such as an evaporative cooling system. The device may be used with method embodiments of the invention to control evaporative cooling based on a more accurate sensed temperature of inlet airflow. Other aspects allow for the device to be used as part of a scheme for controlling evaporative cooling based on measured operating parameters of the combustion turbine such as load, for example.

A power generating system or apparatus is provided comprising a means for cooling an inlet airflow, such as an evaporative water cooler, an inlet airflow temperature sensor for sensing drybulb temperature of inlet airflow and a controller for controlling the cooling means based upon the sensed drybulb temperature and/or other measured operating parameters of a combustion turbine. The power generating system may comprise an electrical generator driven by the combustion turbine. The combustion turbine may have a combustion turbine air inlet for receiving inlet airflow.

In an embodiment, the inlet airflow temperature sensor may be between an evaporative water cooler and the combustion turbine air inlet. Further, the inlet airflow temperature sensor may include a hollow body connected in fluid communication with the inlet airflow, and a temperature-sensing device carried by the hollow body. The hollow body may comprise interior portions defining a tortuous path of airflow there through to reduce water accumulation on the temperature-sensing device so that the temperature-sensing device senses a drybulb temperature. The controller may control the evaporative water cooler based upon the sensed drybulb temperature.

The power generating system may include a plurality of spaced-apart inlet airflow temperature sensors, and the controller may control the cooling means based upon an average of the sensed drybulb temperatures. The controller may also control the cooling means to cool the inlet airflow to a temperature within a predetermined range of a saturation temperature of the inlet airflow. Further, the controller may also control the cooling means to cool the inlet airflow to a temperature within a predetermined approach temperature, which may be the difference between wetbulb and drybulb temperatures. The gas turbine generator may have a baseload rating, and the controller may start the cooling means to cool the inlet airflow at a fraction of the baseload.

The interior portions of the hollow body may include a plurality of baffles in spaced apart relation. The plurality of baffles may be arranged on alternating sides of opposing interior surface portions of the hollow body. For example, the plurality of baffles may extend inwardly in an interdigitated fashion so that the tortuous path may have a serpentine shape. The hollow body may comprise a tube having an inlet at a first end and an outlet at a medial portion. Accordingly, the plurality of baffles may be between the inlet and the outlet. The hollow body may carry various types of temperature sensing devices. For example, the temperature-sensing device may be a resistance temperature detector.

Another aspect of the present invention relates to a method for controlling the cooling means, such as an evaporative water cooler or fogging system, to maintain inlet airflow at an approach setpoint determined as a function of turbine load. The method may include positioning at least one inlet airflow temperature sensor between the cooling means and the combustion turbine air inlet for sensing a drybulb temperature. The method may also include using the sensed drybulb temperature for controlling the cooling means to maintain the inlet airflow at the approach setpoint. This method allows for controlling the evaporative water cooler or fogging system over a range of transient load conditions during operation of the power generating system.

DETAILED DESCRIPTION OF THE INVENTION

Figure 1:
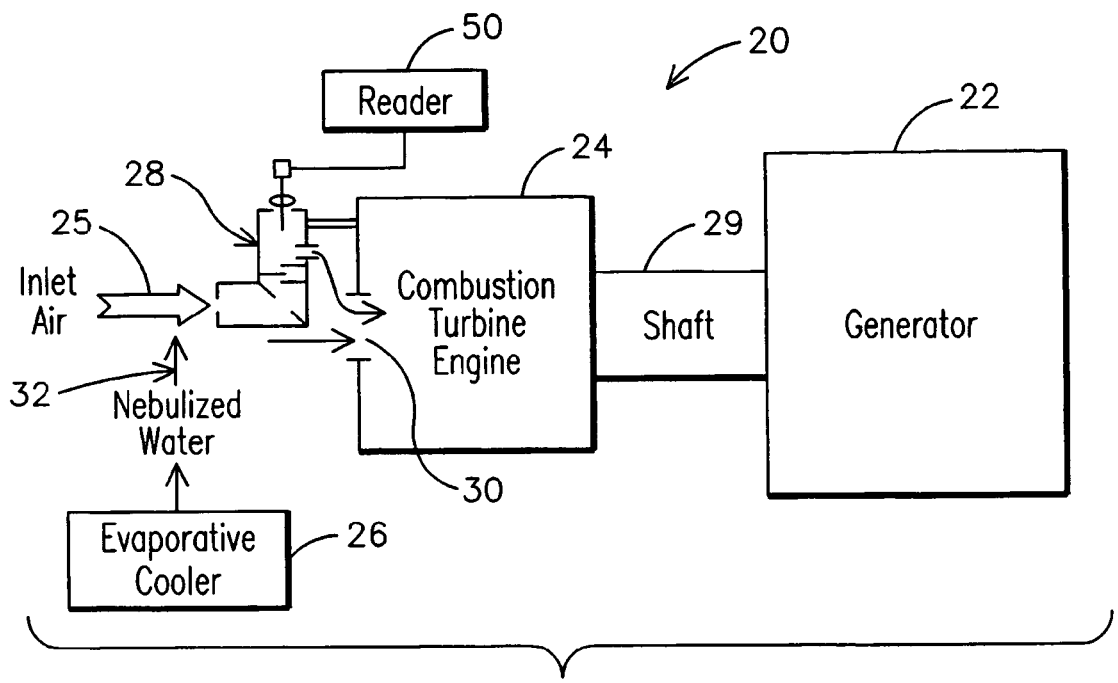
FIG. 1 is a schematic diagram of a power generating system including an inlet airflow temperature sensor according to the present invention.

FIG. 1 illustrates a power generating system or apparatus 20 that may include an inlet airflow temperature sensor 28 in accordance with aspects of the present invention. The power generating apparatus 20 may include a generator 22, a combustion turbine 24 for driving the generator, a means for cooling an inlet airflow 25 received by the combustion turbine, such as evaporative water cooler 26, and a means for sensing the temperature of inlet airflow 25 such as temperature sensor 28.

The combustion turbine 24 may include a compressor for receiving and compressing inlet airflow 25 comprising ambient air. The combustion turbine 24 may also comprise a combustor for adding fuel to the received inlet air and igniting the mixture, and a turbine that is powered by the expansion of heated gases resulting from combustion of the ignited mixture. The expansion of heated gases powers the turbine 24 to drive a shaft 29 connected to the generator 22. The generator 22 may include a stator and, within the stator, a rotor driven by the shaft 29. The turning of the rotor within the stator generates electrical power.

The turbine 24 may include an air inlet 30 through which the inlet airflow 25 is received. Lowering the temperature of the inlet airflow 25 may increase the capacity of the combustion turbine 24. Accordingly, the power generating apparatus 20 may include a means for cooling the inlet airflow such as the evaporative water cooler 26, which evaporates water 32 into the inlet airflow 25 to thereby cool the inlet airflow 25. Water for evaporative cooling of the inlet airflow 25 may be added to the inlet airflow 25 in atomized or nebulized form, for example, as a water spray or mist. Alternate cooling means may be used such as dripping water on media, spraying and other means understood by those skilled in the art.

In an exemplary embodiment the cooling means may be an inlet fogging evaporative cooling system 26' (FIG. 4) that does not employ separate media for introducing water into the inlet airflow 25. Fogging system 26' may be controlled to increase or decrease the rate of water injected or "fogged" into inlet airflow 25' as a function of load on the power generating system 20 as further discussed below.

The inlet airflow temperature sensor 28 may be positioned adjacent the combustion turbine air inlet 30. The inlet airflow temperature sensor 28 provides a temperature reading of the inlet airflow 25 to which nebulized water may be added by the evaporative water cooler 26 or inlet fogging system 26', for example.

Figure 2:
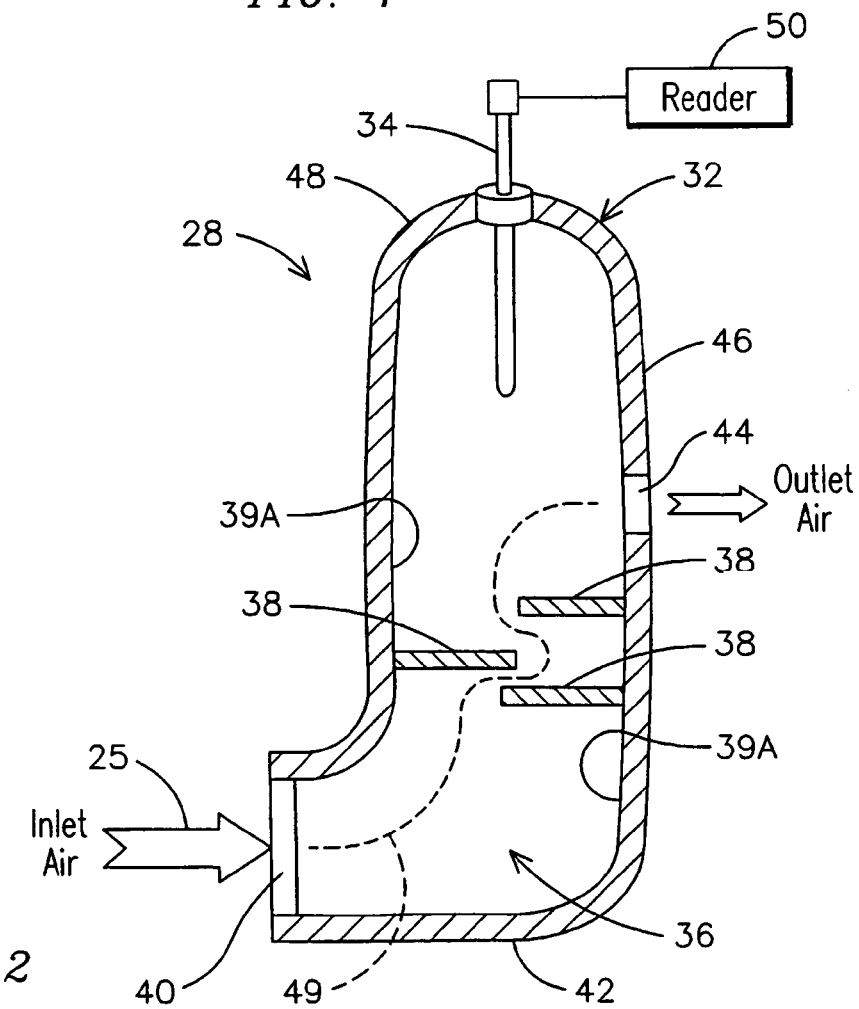
FIG. 2 is a cross-sectional view of the inlet airflow temperature sensor of the power generating system in FIG. 1.

Referring to FIG. 2, the inlet airflow temperature sensor 28 may include a hollow body 32, which may be connected in fluid communication with the inlet airflow 25. A temperature-sensing device 34 may be carried by the hollow body 32 for sensing a temperature of the inlet airflow 25. Interior portions 36 of the hollow body 32 may define a tortuous path 49 of airflow through the hollow body. The tortuous path 49 advantageously reduces water accumulation on the temperature-sensing device 34.

The tortuous path 49 of airflow may be defined by a plurality of baffles 38. As shown, the baffles 38 may be within the interior portions 36 of the hollow body 32. The baffles 38 may be in a spaced-apart relation with respect to one another.

More particularly, the baffles 38 may be arranged on alternating sides of opposing interior surface portions 39A, 39B of the hollow body 32. So arranged, the plurality of baffles 38 extend inwardly in an interdigitated fashion so that at least a portion of the tortuous path 49 has a serpentine shape as shown. As will be understood by those skilled in the art, smaller water droplets can be carried by the airflow and pass through an outlet 44, but larger ones are captured by the baffles 38 and drain out at the bottom of the hollow body 32 or re-evaporate.

The hollow body 32 may comprise a tube having an inlet 40 at a first end 42 of the tube and the outlet 44 at a medial portion 46 of the tube. The plurality of baffles 38 may be positioned between the inlet 40 and the outlet 44.

Although the tortuous path 49 of airflow may be defined by the plurality of baffles 38, it will be apparent to those skilled in the art that a tortuous path alternately may be defined, for example, by other types of air deflectors and/or different shapes of the hollow body 32. For example, the shape of the hollow body 32 may comprise a plurality of bends or folds that similarly define a tortuous path within the interior portions 36 of the hollow body.

The temperature-sensing device 34 may be mounted at a second or upper end 48 of the tube. The first end of the tube 42 may be arcuate. Accordingly, the tube may have a generally J-shape as shown. Other shapes will be readily appreciated by those skilled in the art.

The inlet 40 in the hollow body 32 may be larger than the outlet 44. The relative ratio of the inlet 40 and the outlet 44 advantageously promotes the flow of air through the hollow body 32 at a rate that facilitates the sensing of the temperature of the air by the temperature-sensing device 34.

The temperature-sensing device 34 may include an end that extends into the path of air that flows within the hollow body 32. Accordingly, with water removed from the air as it flows along the tortuous path 49, as described above, the temperature sensed by the temperature-sensing device 34 more accurately reflects the drybulb temperature of the inlet airflow 25. The sensed temperature advantageously corresponds to a drybulb temperature by virtue of the air having been submitted to the tortuous path 49 within the hollow body 32. The tortuous path 49, moreover, reduces the velocity of the air to thereby further improve temperature sensing by the temperature-sensing device 34.

The temperature-sensing device 34 may comprise a resistance temperature detector. Other temperature sensing devices may also serve to sense a temperature of the air within the hollow body 32. For example, a thermocouple or thermistor may alternately be used for temperature sensing, as will be appreciated by those skilled in the art.

A reader 50 may be connected to the temperature-sensing device 34 for providing a conveniently readable indication of the sensed temperature. As will be understood by those skilled in the art, the reader 50 may be a simple meter, for example, or a more complex circuit, including that of a processing circuit either specifically dedicated for temperature reading or part of a general-purpose programmable computer that may be configured for other control aspects of system 20. Moreover, the reader 50 may be positioned away from both the hollow body 32 and the temperature-sensing device 34 carried by the hollow body 32 so that it is easily accessible for monitoring temperatures of the inlet airflow 25 received by the combustion turbine 24.

Figure 3:
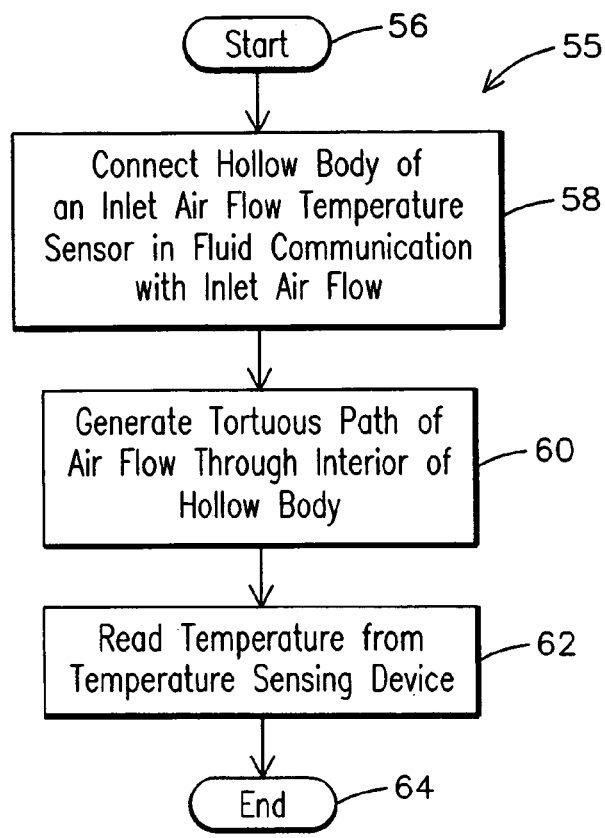
FIG. 3 is a flow chart illustrating a method for sensing inlet airflow temperature according to the present invention.

Referring to the flow chart 55 of FIG. 3, a method aspect of the present invention for sensing inlet airflow temperature for an evaporatively cooled device, such as a combustion turbine 24 is now described. From start step 56, a hollow body 32 of an inlet airflow temperature sensor 28 is connected in fluid communication with an inlet airflow 25 at step 58.

At step 60, a tortuous path 49 of airflow is generated through interior portions of the hollow body 32 so that water accumulation on the temperature-sensing device 34 is reduced. Thus, the temperature-sensing device 34 is advantageously able to render a more accurate reading of the inlet airflow temperature. The temperature is read at step 62, prior to the stop at step 64.

Figure 4:
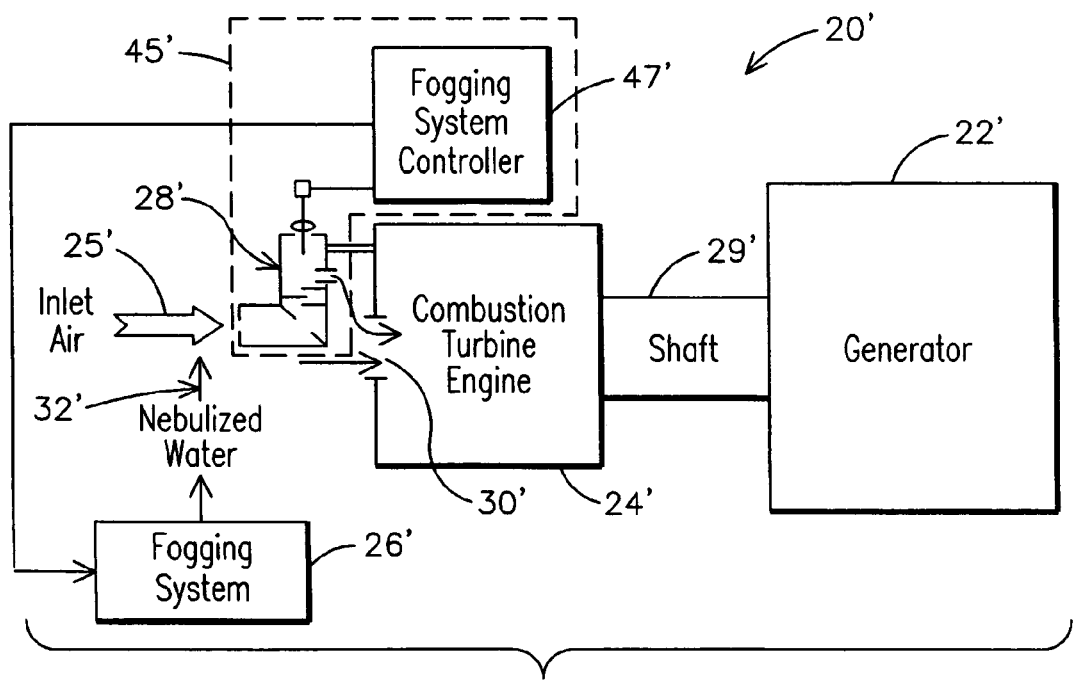
FIG. 4 is a schematic diagram of another embodiment of a power generating system including a control assembly according to the present invention.

Referring to FIG. 4, another exemplary embodiment of the power generating system or apparatus 20' is now described. The exemplary embodiment of the power generating apparatus 20' is similar to the embodiment of the power generating apparatus 20 described above, and may include a control assembly 45' for controlling a means for cooling inlet airflow, such as inlet fogging system 26'. System 26' may include a plurality of nozzles for injecting water into inlet airflow 25'.

More specifically, the control assembly 45' may include a fogging controller 47' connected with fogging system 26' and a means for sensing the drybulb temperature of inlet airflow 25', such as temperature sensor 28'. In this respect, the controller 47' may control the fogging system 26' based at least upon the sensed drybulb temperature and a measured or calculated wetbulb temperature of the inlet airflow 25' as described below.

Figure 5:
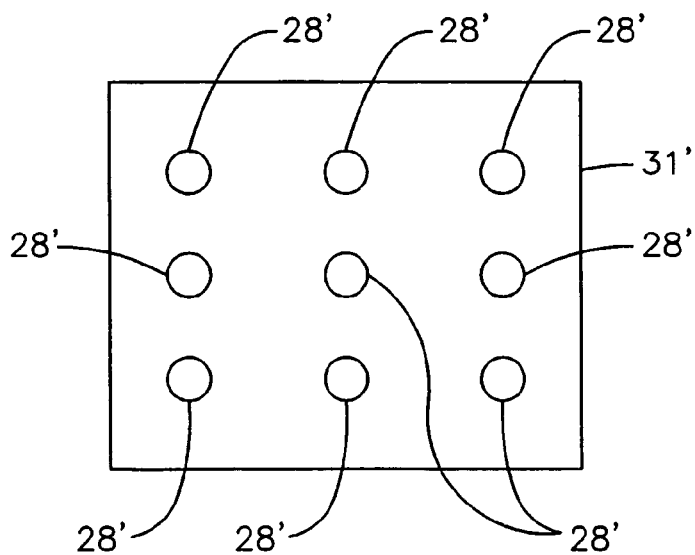
FIG. 5 is a more detailed schematic diagram of a portion of the power generating system shown in FIG. 4 illustrating a plurality of spaced apart inlet airflow temperature sensors.

Referring to FIG. 5, the power generating system 20' may include a plurality of spaced apart inlet airflow temperature sensors 28'. The plurality of inlet airflow temperature sensors 28' may be carried by a trash screen 31', for example, or positioned at other locations within the inlet duct. The trash screen 31' may be positioned in a path of the inlet airflow 25' to prevent trash and other debris from entering the combustion turbine air inlet 30'. The spaced apart inlet airflow temperature sensors 28' may sense a drybulb temperature of the inlet airflow 25' at different locations between the evaporative water cooler 26' and the combustion turbine air inlet 30'. Accordingly, the controller 47' may control the fogging system 26' based on an average of the sensed drybulb temperatures. This advantageously further enhances the accuracy of the measurement of temperature of the inlet airflow 25'.

In an embodiment, the controller 47' may control a cooling means such as evaporative water cooler 26 or fogging system 26' to cool inlet airflow to within a predetermined range of a saturation temperature of the inlet airflow 25'. For example, a target temperature for cooling the inlet airflow may be 2 degrees Fahrenheit above the saturation temperature of the inlet airflow 25' but may also be within a range of about 1 degree Fahrenheit and 0.5 degree Fahrenheit above the saturation temperature.

More specifically, in an embodiment the controller 47' may control the temperature of the inlet airflow 25' to any point between the drybulb temperature and the saturation temperature. The temperature of the inlet airflow 25' may also be set to a predetermined dead band. The predetermined dead band may, for example, be about plus 1.5 degrees Fahrenheit so that the inlet airflow 25' temperature is within the range of about 2 degrees Fahrenheit and 3.5 degrees Fahrenheit above the airflow's saturation temperature. In this respect, controller 47' may control the cooling means to cool the inlet airflow 25' to a temperature within the predetermined dead band.

Figure 6:
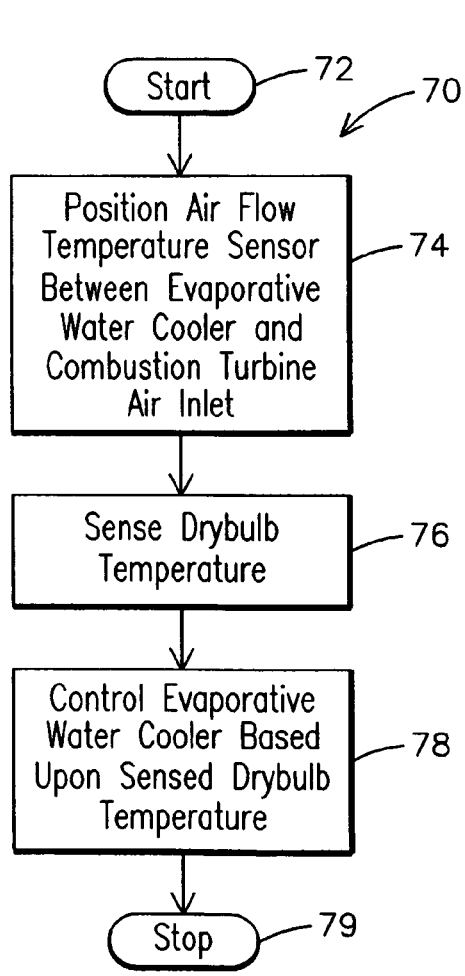
FIG. 6 is a flow chart illustrating a method for operating an evaporative water cooler according to the present invention.

Referring to the flow chart 70 of FIG. 6, and FIG. 1, a method aspect of the present invention is described. From start step 72, an airflow temperature sensor 28 may be positioned between the evaporative water cooler 26 and the combustion turbine air inlet 30 at step 74. At step 76, the airflow temperature sensor 28 may sense a drybulb temperature of the inlet airflow 25. The evaporative water cooler 26 may be controlled based upon the sensed drybulb temperature of the inlet airflow 25 at step 78, prior to the stop at step 79.

Figure 7:
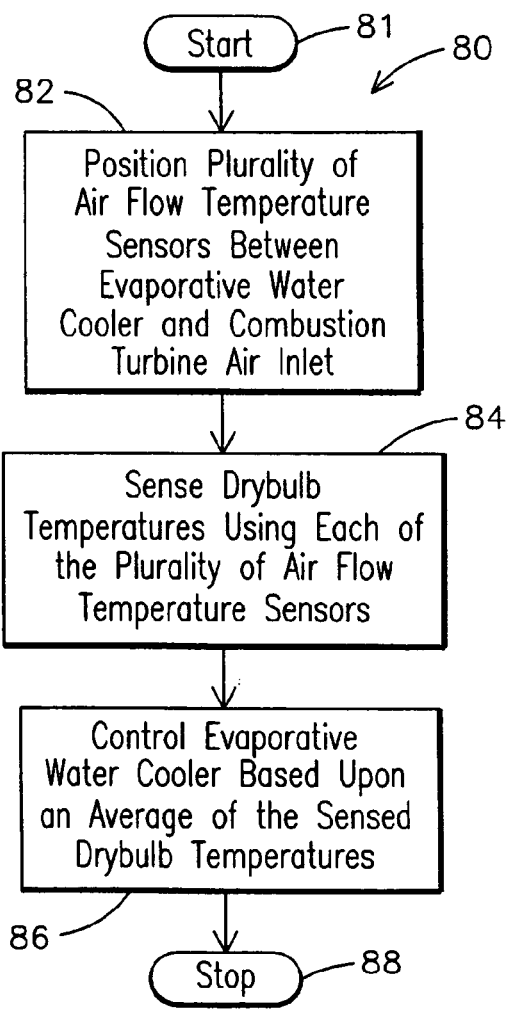
FIG. 7 is a flow chart illustrating another method for operating an evaporative water cooler according to the present invention.

Referring to the flow chart 80 of FIG. 7, and FIG. 1, another method aspect of the present invention is described. From start step 81, a plurality of airflow temperature sensors 28 may be positioned between the evaporative water cooler 26 and the combustion turbine air inlet 30 at step 82. At step 84, a drybulb temperature of the inlet airflow 25 may be sensed by each of the plurality of airflow temperature sensors 28. The evaporative water cooler 26 may be controlled based upon an average of the sensed drybulb temperatures of the inlet airflow 25, prior to the stop at step 88.

Figure 8:
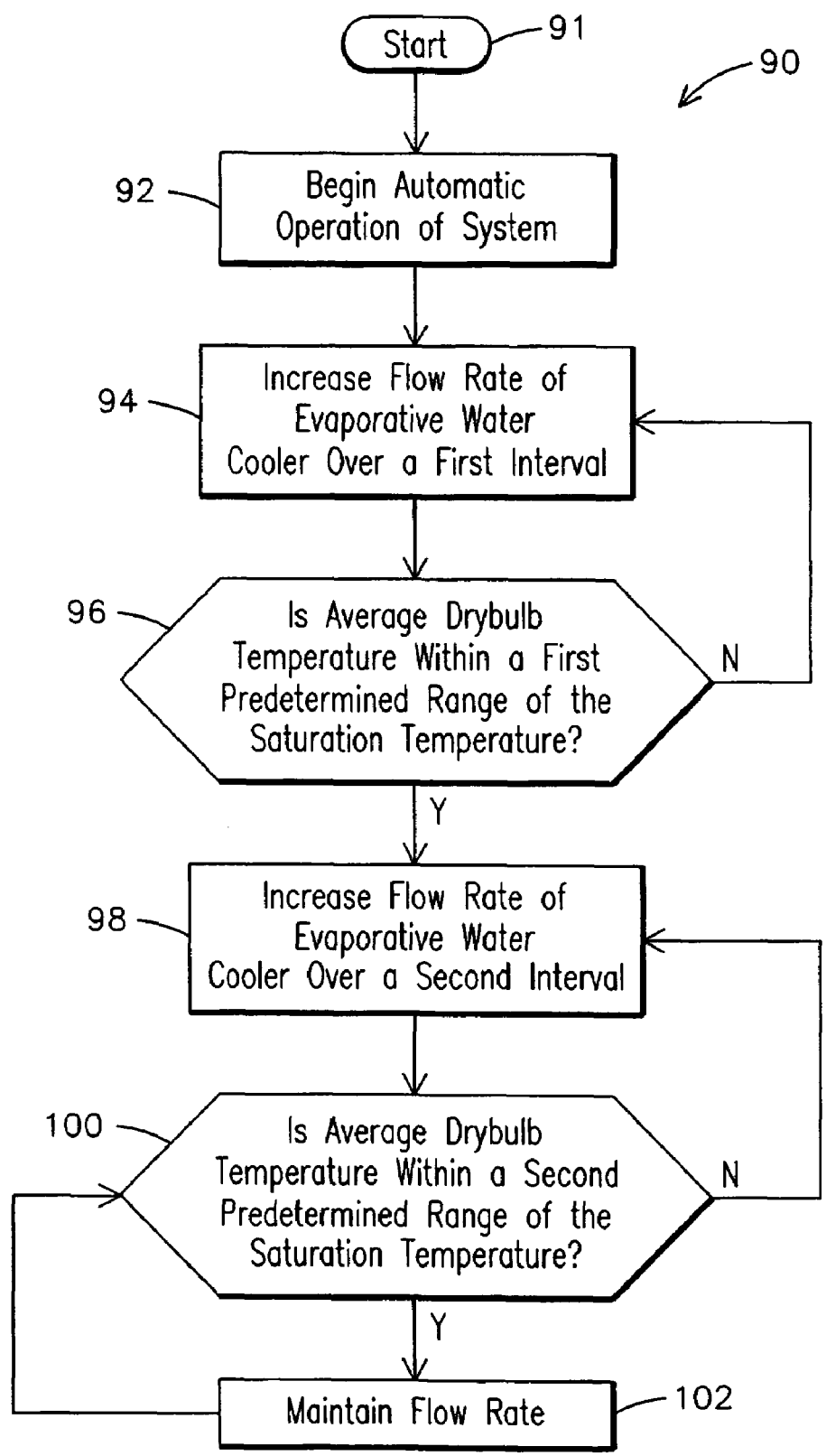
FIG. 8 is a flow chart illustrating automatic operation of the power generating system illustrated in FIG. 4.

Referring to the flow chart 90 of FIG. 8, and FIG. 1, automatic operation of the power generating apparatus 20 is described. From the start step 91, automatic operation of the power generating apparatus 20 is started at step 92. At step 94, the flow rate of the evaporative water cooler 26 may be increased over a first interval. More specifically, the flow rate of the evaporative water cooler 26 may be increased by approximately two gallons per minute every thirty seconds. It has been found that two gallons per minute of increased flow rate every thirty seconds advantageously decreases the temperature of the inlet airflow 25 by approximately one degree Fahrenheit for an 820,000 cubic feet per minute (CFM) airflow. Those skilled in the art will appreciate that alternate embodiments allow for a fractional flow rate change in a discrete time period to achieve a discrete temperature change.

At step 96, it may be determined whether the drybulb temperature of the inlet airflow 25 is within a first predetermined range of the saturation temperature of the inlet airflow 25. The first predetermined range may be between within about 3 and 5 degrees of the saturation temperature. If it is determined that the average drybulb temperature is not within the predetermined range, then the flow rate of the evaporative water cooler 26 may be increased at step 94. If, however, it is determined at step 96 that the average drybulb temperature of the inlet airflow 25 is within the predetermined range, then the interval of increasing the flow rate of the evaporative water cooler 26 may be decreased. More specifically, the flow rate may be increased by two gallons per minute every four minutes. Accordingly, inlet airflow 25 temperature is decreased by about one degree Fahrenheit every four minutes for 820,000 CFM airflow.

At step 100 it may be determined whether the average drybulb temperature of the inlet airflow 25 is within a second or subsequent predetermined range of the saturation temperature of the inlet airflow. The second predetermined range may be between about 2 and 3.5 degrees Fahrenheit of the saturation temperature. If it is determined at step 100 that the average drybulb temperature of the inlet airflow 25 is within the second predetermined range, then the flow rate of the evaporative water cooler 26 may be maintained at step 102. If, however, it is determined at step 100 that the average drybulb temperature of the inlet airflow 25 is not within the second predetermined range of the saturation temperature, then the flow rate of the evaporative water cooler 26 may again be increased over the second interval at step 98.

It will be recognized by those skilled in the art that embodiments of power generating systems may have numerous configurations in accordance with aspects of the invention. For example, in an exemplary embodiment of the power generating system 20' of FIG. 4, the controller 47' may control a means for cooling inlet airflow 25', such as fogging system 26', based upon a sensed drybulb temperature of the inlet airflow 25'. The sensed drybulb temperature may be used to calculate an approach temperature with respect to inlet airflow 25' while turbine 24' is experiencing constant or transient load conditions. The approach temperature may be controlled to within limits of approach temperature setpoints based on operating loads of power generating system 20'.

In one aspect, the approach temperature setpoint may be varied as a function of a percentage load on generator 22' of the power generating system 20'. This allows for control of inlet airflow 25' cooling during transient or non-baseload operation. For example, a range of approach temperature setpoint values may be used when power generating system 20' is ramping up from approximately 70% load to approximately 100% load (baseload). The load on power generating system 20' is dependent on site specific ambient conditions and the system's configuration as will be appreciated by those skilled in the art.

In an embodiment, the approach temperature setpoint may decrease as the load increases. This helps to prevent an overspray from occurring, which is when the compressor inlet temperature (CIT) is approximately equal to the ambient wetbulb temperature ($T_{AWB}$) at any operating load. Overspray may result in water particles entering turbine 24' and damage system components such as compressor blades.

$T_{AWB}$ may be measured directly using known instruments such as a wet sling psychrometer, for example, or calculated as a function of relative humidity or other known techniques as recognized by those skilled in the art. Preventing overspray is advantageous in that it avoids moisture carryover into the compressor of turbine 24', which may damage compressor blades. In one aspect turbine 24' may be hard-tripped if the CIT equals or exceeds $T_{AWB}$. The CIT is the temperature of inlet airflow 25' measured downstream of fogging system 26' proximate air inlet 30' and may be measured using a means for sensing drybulb temperature such as one or more sensors 28'.

Embodiments of the invention may be used with either single or combined cycle power plants. A combined cycle refers to a power plant where the total power output is a combination of combustion and steam cycles. The excess exhaust energy from a combustion turbine, such as turbine 24' may be used to generate high-pressure steam that is sufficient for driving a steam turbine, which may increase the efficiency of the plant.

Referring to FIG. 4, in one aspect controller 47' may be configured to automatically engage fogging system 26' in response to power generating system 20' being remotely dispatched to an independent system operator. Embodiments of the invention allow for automatic engagement and disengagement of the fogging system 26' in response to a remote dispatch demand without system 20' operator intervention. One aspect of the invention allows for controlling the ramp up or ramp down rate of power output with fogging system 26' operating to avoid any appreciable step change in power output that might trip the turbine engine 24' or otherwise cause the power generating system 20' to disengage from a remote dispatch controller.

For example, in an embodiment, controller 47' may control fogging system 26' based on or in response to load changes so that the load ramps up or down at approximately 4 MW/min for an exemplary system 20'. Such an exemplary system may be one sold by the assignee of the present invention known commercially as a W501 FD DLN gas turbine in a 2×1 combined cycle configuration with the fogging system 26' operating on natural gas. This rate of change is the approximate share of one gas turbine to the loading of the 2×1 plant. Alternate embodiments allow for the controlled ramp up or ramp down rate to vary provided that rate is sufficiently "smooth" or linear to avoid abrupt changes in power output that may cause engine 24' to trip, require operator intervention or otherwise cause system 20' to disengage from remote dispatch control.

Figure 9:
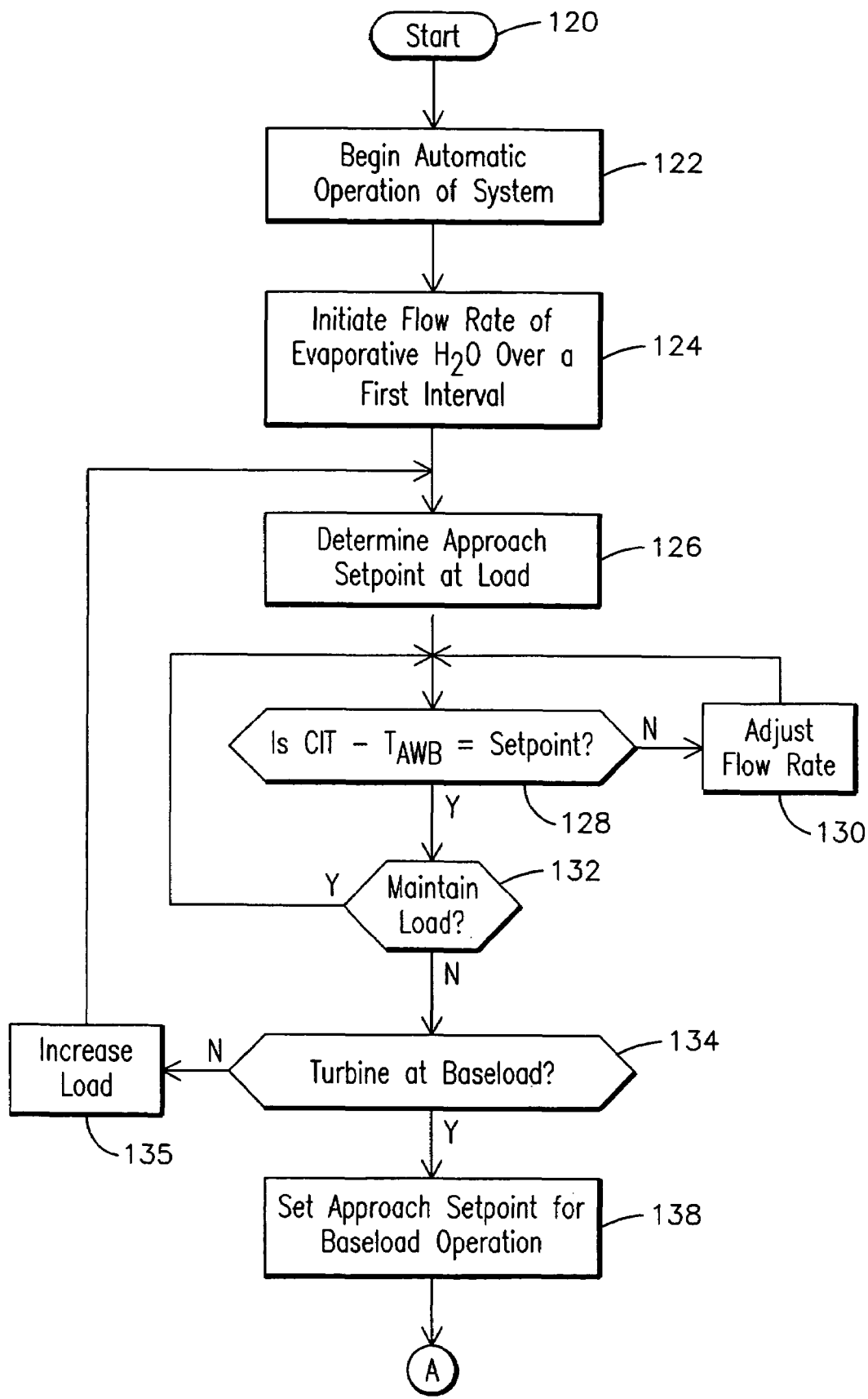
FIG. 9 is a flow chart illustrating an exemplary method for controlling the cooling of inlet airflow according to aspects of the invention.

Referring to FIG. 9, an exemplary method in accordance with aspects of the invention may begin at start step 120. Step 122 allows for automatic operation or engagement of a means for cooling inlet airflow 25', such as fogging system 26', which will be used as an exemplary cooling means for illustration. Fogging system 26' may be automatically engaged by controller 47' in response to a remote dispatch command or as part of a control scheme for controlling system 20' without being remotely dispatched. In an exemplary embodiment, fogging system 26' may be automatically enabled when system 20' is operating at approximately 70% load.

Step 124 allows for an initial flow rate of water to be introduced or injected into the inlet airflow 25' at approximately 70% load. The initial flow rate of water may be based on an initial approach temperature setpoint determined in step 126 and may be approximately 2 GPM, for example. The approach temperature may be the difference between $T_{AWB}$ measured proximate system 20', such as at its weather station, and the CIT measured downstream of the fogging system 26'.

In an embodiment the CIT may be a drybulb temperature of inlet airflow 25' measured proximate air inlet 30' by a means for sensing drybulb temperature. A single sensor measurement may be used or the average of a plurality of measurements taken by a respective plurality of sensing means such as sensors 28'. It will be appreciated that wetbulb temperatures will be relatively constant across the fogging system 26' so that $T_{AWB}$ will be substantially the same as a wetbulb temperature measured proximate air inlet 30'. Further, the drybulb temperatures across fogging system 26' may decrease such that a drybulb temperature of inlet airflow 25' measured proximate air inlet 30' when fogging system 26' is in operation will be lower than an ambient drybulb temperature.

Inventors of the present invention have determined that maintaining the approach temperature within predetermined approach temperature setpoint limits allows for fogging system 26' to operate during transient load conditions while maintaining combustor stability, turbine operating setpoints and emissions output within acceptable limits.

The inventors have also determined that "opening" or increasing the approach temperature setpoints relative to what their respective values would be for optimizing the cooling efficiencies of fogging system 26' allows for controlling water flow rates so that fogging system 26' may operate during transient load conditions of turbine 24'. Exemplary approach temperature setpoints and their respective limits for given loads of turbine 24' are presented in Table 1.

TABLE 1

| Load % | Approach Temperature Setpoint | Lower Limit | Upper Limit |
|---|---|---|---|
| 100 | 2° F. | 1.5° F. | 3.5° F. |
| 90 | 2° F. | 1.5° F. | 3.5° F. |
| 80 | 4° F. | 3.5° F. | 5.5° F. |
| 70 | 6° F. | 5.5° F. | 7.5° F. |
| 60 | 10° F. | 9.5° F. | 11.5° F. |

In one aspect, when the fogging system 26' is enabled the setpoint at 60% load will allow a relatively small quantity of water to be injected into inlet airflow 25', which in turn causes a relatively small amount of cooling to that airflow and consequent increase in power output. As load increases, the amount of water injected into inlet airflow 25', cooling of that airflow and increase in power may proportionately increase.

In one aspect, if there is not a sufficient amount of wetbulb depression to cool inlet airflow 25' then controller 47' and fogging system 26' may remain in a standby mode until the wetbulb depression is sufficient to activate them. The wetbulb depression is drybulb—wetbulb ambient temperatures that may be measured upstream of the fogging system 26'. In this respect, a flow rate of water may be initiated in step 124 over a range of part load operating conditions dependent on the wetbulb depression.

During ramp up of system 20', controller 47' may be configured to continuously calculate the approach temperature (CIT-$T_{AWB}$) in step 128 to determine whether the approach temperature is within acceptable limits of the approach temperature setpoint for a respective load. If the approach temperature is not within acceptable limits then step 130 allows for controller 47' to adjust the initial flow rate of water to affect the approach temperature. This allows for controller 47' to maintain the approach temperature within the desired setpoint limits by increasing or decreasing the flow rate of water during transient loads.

Step 132 allows for determining whether the turbine 24' load is being maintained steady at a part load or whether it is changing such as ramping up to baseload. If the load is maintained steady then controller 47' may continue to determine whether the respective setpoint is being maintained in step 128 and adjust the flow rate of water from fogging system 26' in step 130, if necessary. This allows controller 47' to control fogging system 26' in response to variations in operating parameters of system 20' or changes in environmental conditions that affect the temperature of inlet airflow 25' to maintain the approach temperature within the setpoint limits.

If the load on turbine 24' is increasing then step 134 allows for determining whether turbine 24' is at baseload. If turbine 24' is increasing load in step 135, for example, and is not at baseload then controller 47' may again determine the respective approach temperature setpoint for a given load in step 126. For example, as turbine 24' ramps up from 70% load to baseload controller 47' may select the respective setpoint or limits from Table 1, such as by accessing a lookup table stored in a database, corresponding to the current operating load. This setpoint may be used in step 128 to calculate whether the approach temperature is within the limits of the respective setpoint.

In an embodiment as turbine 24' ramps up from approximately 70% load, controller 47' may incrementally increase the flow-rate of water from fogging system 26' by approximately 2 GPM at thirty-second intervals. This rate may continue until the approach temperature is within approximately a 6° F. limit of $T_{AWB}$, which may occur at or near baseload operation. Once the turbine 24' achieves stable operation at or near baseload, which may be defined as the approach temperature not fluctuating outside this limit for a given time period, the approach temperature setpoint may be reduced at a controlled rate.

Step 138 allows for reducing the approach temperature setpoint at baseload operation down to approximately 2° F. as presented in Table 1. This may be accomplished by reducing the rate of increase of water injection to approximately 2 GPM at approximately four-minute intervals. In an embodiment, the inlet airflow 25' may be cooled until the CIT is within approximately 2° F. to 3.5° F. of $T_{AWB}$.

Figure 10:
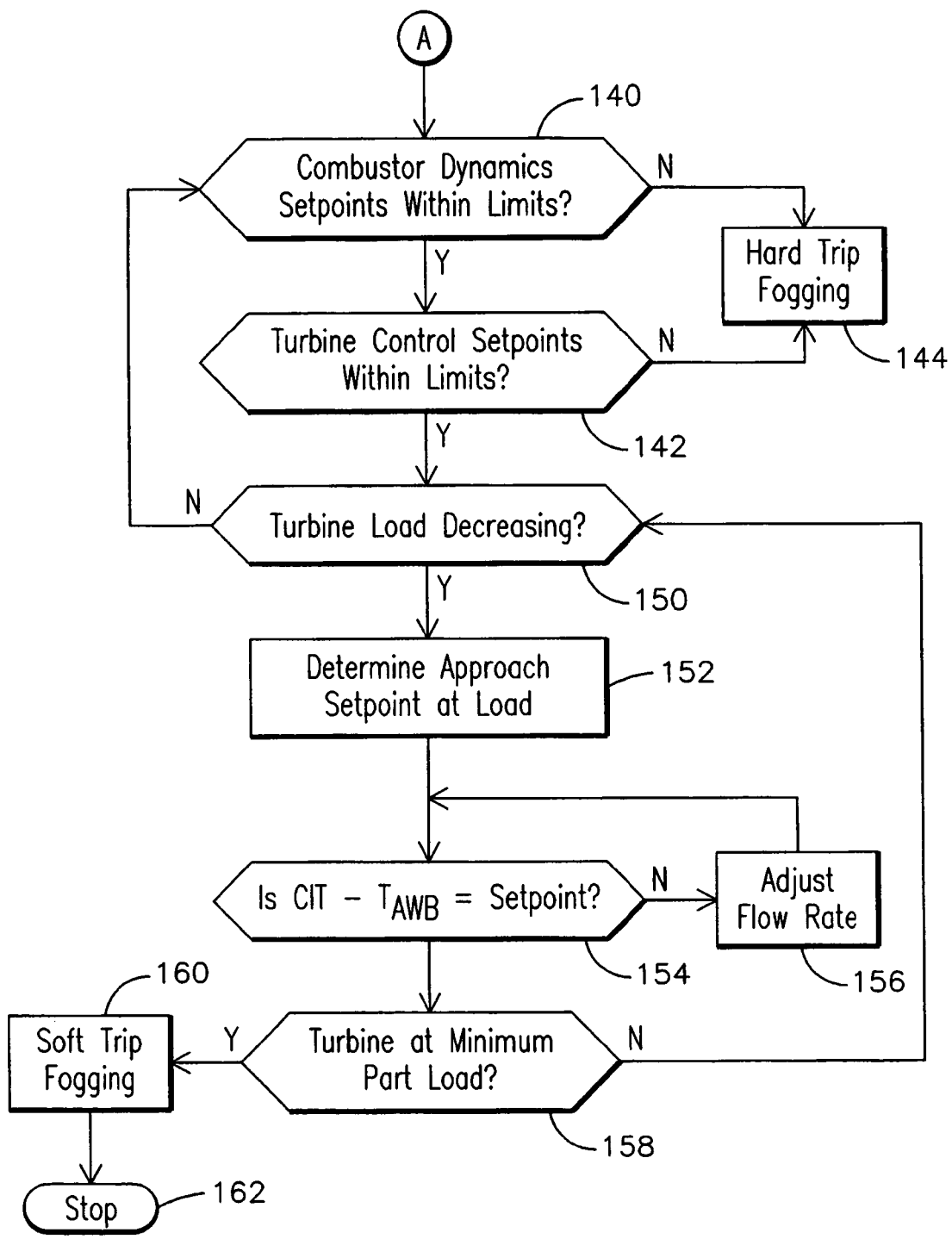
FIG. 10 is a continuation of the flow chart of FIG. 9.

Referring to FIG. 10, with turbine 24' operating at baseload, step 140 allows for determining whether the combustor dynamics or setpoints of system 20' are within limits. Step 142 allows for determining whether other turbine control or operating setpoints are within limits such as those established for turbine exhaust temperature, inlet guide vane angles, pilot fuel fractions as well as others recognized by those skilled in the art. If the combustor dynamics or turbine controls are not within acceptable limits then step 144 allows for the fogging system 26' to be hard-tripped or shut down.

It will be recognized by those skilled in the art that the approach temperature setpoints and water injection flow rates may vary as a function of the means used for introducing water into inlet airflow 25'. For example, certain water injector systems function at high pressure and their water nozzle design might restrict flexibility for varying or "tuning" water flow rate. Alternate embodiments of the invention allow for varying setpoints and flow rates as a function of the rate at which a water injection system atomizes water.

It will be further recognized by those skilled in the art that combustor dynamics and other turbine control or operating setpoints may vary as a function of the type of system 20' under operation as well as how system 20' is tuned and the environmental conditions within which it is operating. In this respect, the specific combustor dynamics and other turbine control or operating setpoints may be established on a site and/or turbine specific basis. It will also be appreciated that these limits may be determined while the load on system 20' is increasing or decreasing.

Step 150 allows for determining whether the load on turbine 24' is decreasing such as when the turbine is ramping down from baseload to a part load operation, for example. If it's not decreasing then the combustor dynamics and other turbine control or operating setpoints may be continuously determined to be within limits in steps 140, 142, respectively to ensure acceptable operation of system 20'.

If turbine 24' load is decreasing then step 152 allows for determining an approach temperature setpoint for a given load such as by selecting a respective setpoint or limits from Table 1 from a lookup table. Step 154 allows for calculating the approach temperature (CIT-$T_{AWB}$) to determine whether the approach temperature is within acceptable limits of the respective approach temperature setpoint. If the approach temperature is not within acceptable limits then step 156 allows for controller 47' to adjust the flow rate of water to affect the temperature of inlet airflow 25'. This allows for controller 47' to control the cooling of inlet airflow 25' so that the approach temperature is maintained within the desired setpoint limits.

In one aspect step 158 allows for determining whether turbine 24' has reached a minimum part load. If that minimum part load has not been reached then the control scheme may return to step 150 to determine whether the turbine load is decreasing. If the minimum part load has been reached then controller 47' may soft-trip the fogging system 26' in step 160, such as when turbine 24' attains approximately 60% load, for example. A soft-trip may be defined as ramping down the water flow in 2 GPM steps at a controlled rate down to 0 GPM.

In one aspect, power generating system 20' may operate under an overall control logic scheme based on turbine 24' load. As will be appreciated by those skilled in the art, a normalized load curve may be used to estimate what the maximum load will be on turbine 24' at a given CIT. Similarly, an inlet guide vane schedule and pilot fuel fractions, for example, may be set for a system 20' as a function of the normalized load curve. In an embodiment, the load curve may be the basis for controlling fogging system 26'.

In this respect, with fogging system 26' under load control, other operating parameters of system 20' may be biased to accommodate the effects of cooling inlet airflow 25' over transient load conditions. For example, function generators of a system controller (not shown) may be used to maintain stable or desired operating characteristics of system 20' when the fogging system 26' is in operation. Control of system 20' may include exemplary modules for controlling system 20' operating parameters such as fuel fractions, inlet guide vane positions and maximum step changes of airflow into turbine 24', as well as other parameters recognized by those skilled in the art. These operating parameters may be adjusted or biased in response to the cooling of inlet airflow 25' as a function of the desired overall performance or operating characteristics of system 20'.

For example, if system 20' is under part load operation while ramping up or ramping down with fogging system 26' in operation the combustor dynamics may increase. A pilot fuel fraction controller may then increase the pilot fuel fraction bias to be higher than one, which may change the pilot fuel fractions to decrease combustor dynamics. If under the same conditions, emissions from turbine 24' increase with no increase in combustor dynamics then the pilot fuel fraction bias may be decreased to be lower than one, which may change the pilot fuel fractions to decrease emissions.

Similarly, inlet guide vane position and a maximum step change of airflow into turbine 24' may be biased when the fogging system 26' is in operation to ensure that the desired overall performance or operating characteristics of system 20' are maintained.

Alternate embodiments of the invention allow for the approach temperature setpoints to be calculated as a function of other operating parameters of system 20' such as inlet guide vane position, emissions or pilot fuel fraction percentages, for example.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. A method of controlling inlet airflow cooling of a power generating system comprising a combustion turbine engine having a combustion turbine air inlet for receiving the inlet airflow and a cooling means affecting an approach temperature of the inlet airflow, the method comprising:
   controlling the approach temperature as a function of load on the power generating system wherein the approach temperature is controlled over transient load conditions on the power generating system of between about a 70% load and a baseload rating of the power generating system;
   connecting a unitary hollow body of an inlet airflow temperature sensor in fluid communication with the inlet airflow to intercept a portion of the inlet airflow, the inlet airflow temperature sensor comprising a temperature sensing device carried by the unitary hollow body;
   generating a tortuous path of airflow through an interior of the unitary hollow body to reduce water accumulation on the temperature sensing device while reading a signal from the temperature sensing device; and
   using the signal from the temperature sensing device to calculate the approach temperature.

2. The method of claim 1 further comprising:
   controlling the approach temperature as a function of load on the power generating system when the power generating system is remotely dispatched.

3. The method of claim 1 further comprising:
   initiating the cooling means when the load is less than a baseload rating of the power generating system; and
   increasing a degree of cooling in a plurality of steps to incrementally reduce the approach temperature as the load increases to the baseload rating.

4. The method of claim 3 further comprising:
   controlling the approach temperature to the following approach setpoint values an limits:

| Load % | Approach Temperature Setpoint | Lower Limit | Upper Limit |
|---|---|---|---|
| 100 | 2° F. | 1.5° F. | 3.5° F. |
| 90 | 2° F. | 1.5° F. | 3.5° F. |
| 80 | 4° F. | 3.5° F. | 5.5° F. |
| 70 | 6° F. | 5.5° F. | 7.5° F. |
| 60 | 10° F. | 9.5° F. | 11.5° F. |

5. The method of claim 1 further comprising:
   controlling the approach temperature to a predetermined approach temperature setpoint; and
   decreasing the approach temperature setpoint as load on the power generating system increases.

6. The method of claim 1 further comprising:
calculating the approach temperature as the difference between a drybulb temperature of the inlet airflow and a wetbulb temperature of the inlet airflow; and
measuring the dry bulb temperature downstream of the cooling means proximate the air inlet, the signal from the temperature sensing device indicative of the dry bulb temperature.

7. The method of claim 1 further comprising:
controlling a drybulb temperature of the inlet airflow to be within about 5° F. of a saturation temperature of the inlet airflow; and
increasing a degree of cooling in a plurality of steps to incrementally reduce the drybulb temperature to about 2° F. when the load on the power generating system is at about the baseload rating.

8. The method of claim 1, the step of controlling the approach temperature comprising:
controlling the cooling means to vary a flow rate of water by predetermined increments at predetermined load intervals;
controlling the cooling means to vary the flow rate of water until the approach temperature is within a predetermined limit of an ambient wetbulb temperature; and
reducing the approach temperature setpoint at baseload operation.

9. The method of claim 1 further comprising:
initiating the cooling means at a predetermined load on the power generating system that is approximately a 70% load;
calculating the approach temperature; and
controlling the cooling means during ramp up of the power generating system to maintain an approach temperature within a range of an approach temperature setpoint that varies as a function of load on the power generating system.

10. The method of claim 1 further comprising:
controlling the approach temperature by injecting atomized water directly into the inlet airflow.

11. The method of claim 1 wherein generating the tortuous path of airflow comprises providing a plurality of baffles in spaced-apart relating in the interior of the unitary hollow body.

12. The method of claim 11 wherein the plurality of baffles are arranged on alternating sides of opposing interior surface portions.

13. The method of claim 12 wherein the plurality of baffles extend inwardly in an interdigitated fashion so that the tortuous path has a serpentine shape.

14. The method of claim 11 wherein the unitary hollow body comprises a tube having an inlet at a first end and an outlet at a medial portion; and wherein the plurality of baffles are between the inlet and the outlet.

15. The method of claim 14 wherein the temperature sensing device is mounted at a second end of the tube.

* * * * *